UNITED STATES PATENT OFFICE.

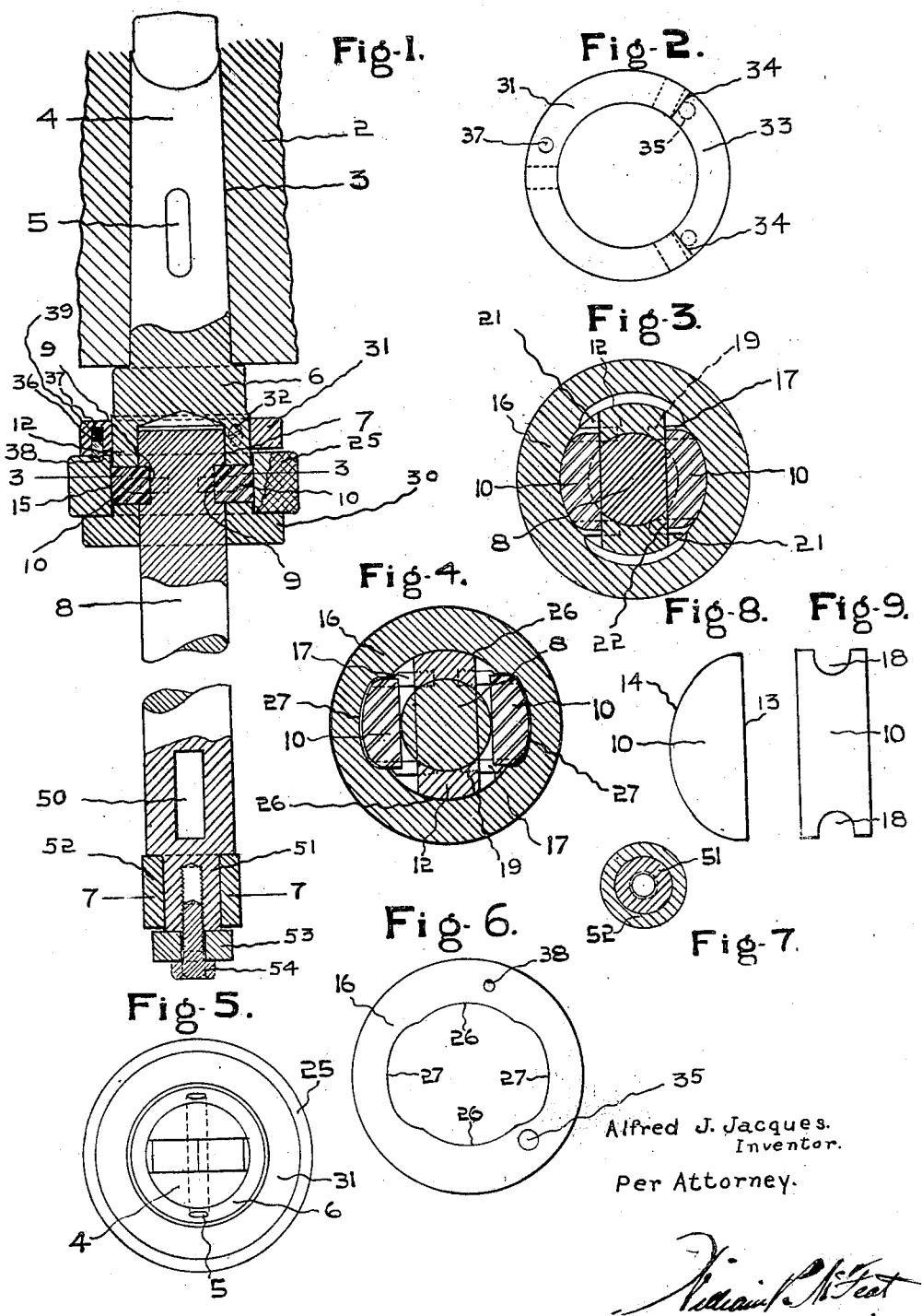

ALFRED JOSEPH JACQUES, OF MONTREAL, QUEBEC, CANADA.

DRILL-PRESS.

1,380,912.   Specification of Letters Patent.   Patented June 7, 1921.

Application filed May 10, 1920. Serial No. 380,388.

*To all whom it may concern:*

Be it known that I, ALFRED JOSEPH JACQUES, of Montreal, in the Province of Quebec, Canada, tool-maker, a subject of the King of Great Britain, have invented certain new and useful Improvements in Drill-Presses; and I do hereby declare that the following is a full, clear, and exact description thereof.

My invention relates to chucks for drill presses and more particularly for drill presses for enlarging holes.

My invention has for its object to provide a chuck for this type of machine which will be self-locking when in use and more quickly operated than chucks of this nature heretofore known. Further objects are to provide a construction in which the possibility of the tool becoming jammed within the chuck will be reduced to a minimum and which will present a smooth exterior thereby avoiding the injuries to operators which have been so frequent in the past with the machines in common use. And a final object is to provide a boring bar adapted to co-act with the chuck and so constructed that wear upon the bar will be reduced to a minimum.

For full comprehension however of my invention reference must be had to the accompanying drawings in which similar reference characters indicate the same parts and wherein:

Figure 1 is a part elevation and part sectional view of a portion of a drill press constructed according to my invention;

Fig. 2 is an end elevation of the chuck shank;

Fig. 3 is a transverse sectional view taken on line 3—3 Fig. 1, illustrating the jaws of the chuck in closed position;

Fig. 4 is a similar view to Fig. 3 illustrating the jaws in open position;

Fig. 5 is a detail elevation of the device for actuating the jaws of the chuck.

Fig. 6 is a detail view of the retaining ring for said device;

Fig. 7 is a transverse sectional view taken on line 7—7 Fig. 1, and

Figs. 8 and 9 are detail elevations of the jaws of the chuck.

In the accompanying drawings the spindle of the drill press is indicated at 2 and has a tapered socket 3 adapted to receive a correspondingly tapered shank 4 constituting an integral part of my improved chuck such shank having a transverse key slot 5 to receive a key which is adapted to be passed through the shank and spindle. The chuck is located at the outer end of the shank and consists of a body portion of substantially cylindrical form 6 containing a socket 7 adapted to receive the shank of the tool indicated at 8, such shank having diametrically oppositely disposed notches 9, adapted to accommodate jaws 10. Each of these jaws extends through an opening 21 in the side wall 12 of the socket, the outer side of the jaw lying substantially flush with the outer face of such wall when in position gripping the tool.

Each jaw consists of a member of solid cross section presenting a flat gripping face 13 and an outwardly curved face 14, the face 13 being adapted to bear flat against the tool within the notch 9 while the curved face is in bearing relation with the cam surface 15 of the annulus 16. The jaws are guided in their movement to and from the tool and held against displacement relatively to the body by studs 17 lying in notches 18 in the outside ends of the jaws, such screws being screwed into the body as at 19. The transverse cut by which each opening 21 is formed is carried completely across the body and presents a flat face 22 against which the face 13 on the jaw is adapted to bear when the latter is gripping the tool. This arrangement prevents the tool from moving in its socket.

The annulus 16 encircles the body in position to bear upon the faces 14 of the jaws and its periphery is knurled as at 25 to enable it to be manually operated. The cam surface 15 presented by this annulus is constituted by a pair of diametrically oppositely disposed rises 26 and a pair of diametrically oppositely disposed falls 27 the former being located at right angles to the latter. With this construction and arrangement of parts by giving the annulus a quarter turn the jaws are forced into engagement with the tool and are released by reversing the operation.

The annulus is retained upon the body by a circumferential flange 30 formed integrally with the latter and surrounding the mouth of the socket and by a ring 31. This ring is retained in position by screws 32. To limit the throw of the annulus to a quarter turn, the face of the ring in bearing relation with the annulus is cut away as at 33 to present a pair of abutments 34 and a pin 35 is mounted upon the annulus in position to move between these abutments.

In order to lock the annulus in position with the jaws gripping the tool or boring bar a socket 36 is formed in the ring and slidably contains a pin 37 adapted to be locked in a depression 38 in the annulus, a helical spring 39 bearing between the inner end of the socket 36 and the adjacent end of the pin yieldingly maintaining the latter in engagement with the annulus.

My improved chuck is particularly designed to receive the type of boring bar indicated. This boring bar adjacent its lower end has a transverse opening 50 adapted to receive a cutter and such lower end is reduced in diameter as at 51 and rotatably carries a case hardened collar 52, the collar being held in position thereon by a disk 53 and screw 54 extending into the reduced end of the boring bar. The purpose of this construction is to reduce wear upon the boring bar to a minimum. Heretofore in enlarging holes it was necessary to employ a boring bar which would slidably fit the hole to be enlarged and when the bar became worn it was rendered useless. With the construction and arrangement of parts herein disclosed, a bar of one diameter may be employed to enlarge holes of different diameters by mounting a collar upon the bar of such a diameter that it will slidably fit the hole, the wear being thereby taken up by the collar.

From the foregoing it will be seen that with the jaws in open position the shank of the boring bar may be inserted into the chuck, the annulus given a quarter turn thereby locking the bar in position. When it is desired to remove the bar the annulus is given a quarter turn in the reverse direction.

What I claim is as follows:—

1. In a drill press the combination with a tool having a notched shank, of a chuck for holding said tool, said chuck consisting of a body of circular cross-section and containing a socket at one end adapted to receive the notched tool shank, the wall of said socket having diametrically oppositely disposed openings therein, a jaw mounted in each of said openings and movable to and from engagement with the notches in said tool, means guiding said jaws in their movement to and from the tool, an annulus encircling said body and presenting a cam surface in operative engagement with said jaws, means retaining said annulus in position upon the body, said means consisting of a circumferential flange formed integrally with the body and in bearing relation with one side of said annulus and a ring encircling said body and bearing against the opposite side of said annulus, means detachably securing said ring upon the body, means for limiting the extent of movement of said annulus, the said means consisting of a pair of abutments upon said ring and a pin upon the annulus and movable between the abutments, means for locking said annulus in position with the jaws in engagement with the tool, said last-mentioned means consisting of a pin slidably mounted in said ring with its outer end in bearing relation with the adjacent side of the annulus, a spring adapted to yieldingly maintain the pin in engagement with said annulus and a socket in the annulus adapted to accommodate the pin.

2. In a drill press the combination with a tool having a notched shank; of a chuck for holding said tool, said chuck consisting of a body of circular cross-section and containing a socket at one end adapted to receive the notched tool shank, the wall of said socket having diametrically oppositely disposed openings therein, the length of said openings extending transversely to the axis of the tool, a jaw mounted in each of said openings and movable to and from engagement with the notches in said tool, each jaw extending transversely to the axis of the tool and being of semi-circular form presenting a curved outer face and a flat gripping face, means guiding said jaws in their movement to and from the tool, an annulus encircling said body and presenting a cam surface in operative engagement with said jaws, means retaining said annulus in position upon the body, said means consisting of a circumferential flange formed integrally with the body and in bearing relation with one side of said annulus and a ring encircling said body and bearing against the opposite side of said annulus, means detachably securing said ring upon the body, means for limiting the extent of movement of said annulus, the said means consisting of a pair of abutments upon said ring and a pin upon the annulus and movable between the abutments, means for locking said annulus in position with the jaws in engagement with the tool, said last mentioned means consisting of a pin slidably mounted in said ring with its outer end in bearing relation with the adjacent side of the annulus, a spring adapted to yieldingly maintain the pin in engagement with said annulus and a socket in the annulus adapted to accommodate the pin.

3. In a drill press the combination with a tool having a notched shank; of a chuck for holding said tool, said chuck consisting of a body of circular cross-section and containing a socket at one end adapted to receive the notched tool shank, the wall of said socket having diametrically oppositely disposed oblong openings therein, the length of said openings extending transversely to the axis of the tool, a jaw mounted in each of said openings and movable to and from engagement with the notches in said tool, each jaw extending transversely to the axis of the tool and being of semi-circular form presenting a curved outer face and a gripping face, means guiding said jaws in their movement to and from the tool, said means consisting of studs mounted upon the body on opposite sides of the openings therein and disposed parallel to the direction of movement of the jaws, and notches in said jaws permitting the latter to straddle the studs, an annulus rotatably encircling said body and presenting a cam surface in operative engagement with said jaws whereby the jaws are actuated when the annulus is turned, means retaining said annulus in position upon the body, said means consisting of a circumferential flange formed integrally with the body and in bearing relation with one side of said annulus and a ring encircling said body and bearing against the opposite side of said annulus, means detachably securing said ring upon the body, means for limiting the extent of movement of said annulus, the said means consisting of a pair of abutments upon said ring and a pin upon the annulus and movable between the abutments, means for locking said annulus in position with the jaws in engagement with the tool, said last mentioned means consisting of a pin slidably mounted in said ring with its outer end in bearing relation with the adjacent side of the annulus, a spring adapted to yieldingly maintain the pin in engagement with said annulus and a socket in the annulus adapted to accommodate the pin.

In testimony whereof I have signed my name to this specification in the presence of two witnesses.

ALFRED JOSEPH JACQUES.

Witnesses:
 JOHN R. INGRAM,
 WILLIAM J. C. HEWETSON.